United States Patent [19]  [11] 4,014,473
Rosenberg  [45] Mar. 29, 1977

[54] FLUID-FLOW CONTROL DEVICES PARTICULARLY USEFUL AS DRIPPER NOZZLES IN TRICKLE IRRIGATION

[76] Inventor: Peretz Rosenberg, Moshav Beit Shearim, Israel

[22] Filed: Dec. 15, 1975

[21] Appl. No.: 640,856

Related U.S. Application Data

[63] Continuation-in-part of Ser. No. 364,049, May 25, 1973, Pat. No. 3,938,552.

[30] Foreign Application Priority Data

June 11, 1975 Israel .................................... 47455

[52] U.S. Cl. ......................................... 239/542
[51] Int. Cl.² ......................................... B05B 15/00
[58] Field of Search .......... 239/101, 102, 542, 381, 239/382, 383

[56] References Cited

UNITED STATES PATENTS 3,734,410  5/1973  Bruno .................. 239/102
3,938,552  2/1976  Rosenberg .................. 239/542 X Primary Examiner—John J. Love
Attorney, Agent, or Firm—Benjamin J. Barish

[57] ABSTRACT

A fluid-flow control device particularly useful as a dripper nozzle in trickle irrigation comprises a conduit member having an enlarged convex head attached to a cap defining a housing within which is enclosed a double-concave regulating member, the convex head having an axial passageway engageable by one face of the concave member, and the inner face of the cap having a depending boss engaging the other face of the concave member, the arrangement being such that during the flow of fluid through the passageway, the regulating member is set into rapid oscillating movement axially of the conduit member to rapidly open and close its outlet and thereby to control the flow of the fluid therethrough.

6 Claims, 6 Drawing Figures

FLUID-FLOW CONTROL DEVICES PARTICULARLY USEFUL AS DRIPPER NOZZLES IN TRICKLE IRRIGATION

CROSS-REFERENCES TO RELATED APPLICATIONS

The present application is a continuation-in-part of my pending application Ser. No. 364,049 filed May 25, 1973, now U.S. Pat. No. 3,938,552 of Feb. 17, 1976, which latter application is in turn related to U.S. Pat. No. 3,882,890 of May 13, 1975.

BACKGROUND OF THE INVENTION

The present invention relates to fluid-flow control devices. The invention is particularly useful with respect to trickler or dripper nozzles commonly used in trickle irrigation, and is therefore described below with respect to that application for purposes of example only.

The many different types of dripper nozzles presently in use are generally characterized by the provision of small openings and/or circuitous paths for the water in order to cause a pressure drop so that the water exits in a slow trickle. Such nozzles, however, are costly to produce and/or are easily clogged.

My co-pending application Ser. No. 364,049 filed May 25, 1973, now U.S. Pat. No. 3,938,552 discloses a fluid-flow control device including a regulating member which is set into rapid oscillating movement to rapidly open and close an outlet passageway formed in a conduit member and thereby to control the flow of fluid therethrough. Two embodiments of the invention were disclosed in that application. In one embodiment, the conduit member was a tube formed with a radial outlet, and the regulating member was a ring enclosing the tube at its radial outlet, the ring being set in a rapid oscillating movement in a radial direction with respect to the tube to open and close its outlet. In a second described embodiment, the conduit member was formed with an axial outlet, and the regulating member was a disc which was set into rapid oscillating movement in an axial direction with respect to the conduit member to open and close its outlet.

SUMMARY OF THE PRESENT INVENTION

The present invention is particularly directed to the second of the above-mentioned embodiments, namely to the one including the axially-oscillating disc, and among the objects of the present invention are to provide improvements in performance as well as advantages in the manufacture and assembly of such a device.

The improvement of the present invention is generally characterized in that the conduit member face formed with the passageway outlet is of convex configuration, and that both faces of the regulating member are of concave configuration of a slightly larger radius of curvature, the inner surface of the housing including a depending boss adapted to engage the center of the confronting concave face of the regulating member.

BRIEF DESCRIPTION OF THE DRAWINGS

The invention is herein described, by way of example only, with reference to the accompanying drawings, wherein.

EMBODIMENTS OF FIGS. 1–4

(From copending Application Ser. No. 364,049, now U.S. Pat. No. 3,938,552)

Figure 1:
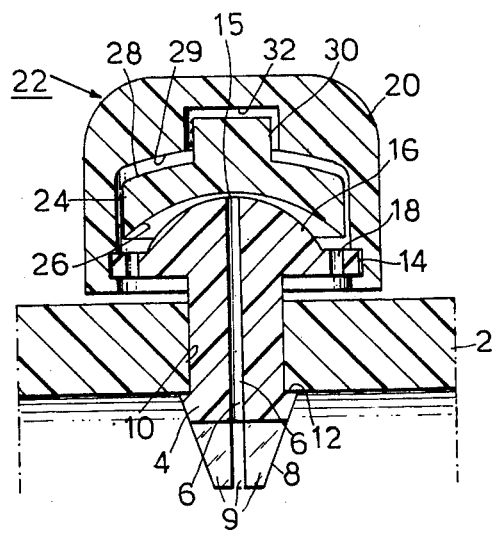
FIGS. 1–4 illustrate two variations of the axially-oscillating disc embodiment of the invention disclosed in my co-pending application Ser. No. 364,049, now U.S. Pat. No. 3,938,552, FIG. 1 being a longitudinal sectional view of one variation, FIGS. 2 and 3 being top and bottom plan views of the variation of FIG. 1, and FIG. 4 being a corresponding view as FIG. 1 of a second variation.
Figure 2:
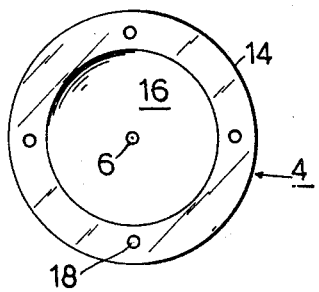

FIGS. 1 and 2 illustrate a water trickler nozzle tapped to a plastic water supply pipe 2. The nozzle includes a conduit member in the form of a tube 4 having a throughgoing axial bore 6. One end of tube 4 is tapered, as shown at 8, and is formed with a pair of radial cross slits 9. The tapered end facilitates the insertion of the tube into an opening formed in the wall of the water supply pipe 2, and the cross slits 9 decrease the possibility of clogging that end of the tube when water passes from the supply pipe 2 into axial bore 6.

Above the tapered portion 8, tube 4 is formed with an annular groove 10 for seating in the wall of the plastic supply pipe 2. One end of groove 10 is defined by an annular wall 12 extending at right angles to the axis of the tube, and the other end of groove 10 is defined by an annular ring 14 formed integrally with the tube. The outlet 15 of passageway 6 is formed in face 16 of convex configuration and is circumscribed by ring 14. Ring 14 is formed with four (FIG. 2) openings 18 for a purpose to be described below.

A cap 20 is fixed to ring 14, as by having the ring press-fitted into an annular groove formed on the inner wall of the cap. Ring 14 and cap 20 define a housing 22 enclosing the outlet end 16 of tube 4.

Freely disposed within housing 22 is a disc shaped regulating member 24, there being sufficient space within the housing to permit some axial movement of this member toward and away from the tube outlet end 16. Face 26 of regulating member 24 facing tube outlet end 16 is of concave configuration and engages the convex tube outlet end 16, whereas the opposite face 28 of the regulating member is of convex configuration and engages the concave inner surface 29 of cap 20. Regulating member 24 is further formed with an upstanding boss 30 receivable in a recess 32 formed centrally of the inner surface of cap 20.

The radius of curvature of the concave face 26 of regulating member 24 is slightly larger than that of the convex tube outlet end 16. Thus, when the regulating member engages tube outlet end 16, it contacts the same centrally of that end (i.e., it closes the outlet of axial passageway 6), while the outer or peripheral portion of the concave face of the regulating member is spaced from the confronting face of the convex tube outlet end, the two faces diverging from each other to provide a spacing between the two which increases from the tube outlet. As one example, the radius of curvature of convex face 16 may be 5 mm. and that of the concave face 26 may be 6 mm.

It has been found that when the water issues from the end of the axial passageway 6 and impinges the concave face 26 of regulating member 24, it sets the regulating member into rapid vibration or oscillation moving same axially of the tube rapidly toward and away from the tube outlet to close and open the axial passageway 6. It is believed that this is brought about by the following interplay of forces: On the one hand, since the water flow through axial opening 6 is at a higher velocity centrally of the regulating member where the water impinges thereon, than at the outer edges and the other faces of the regulating member where the increased space decreases the velocity, as the regulating member moves away from the outlet of passageway 6, a pressure gradient is produced which is lower at the periphery of passageway 6; this tends to move the regulating member against the outlet of passageway 6, closing same. On the other hand, when the outlet is thus closed, the tube water pressure acting on the inner side of the regulating member tends to move it away from the outlet. It is believed that this interplay of forces causes the rapid oscillating movement of the regulating member, but whatever the explanation, this construction has been found to produce the foregoing oscillating movement causing the regulating member 24 to open and close the passageway 6 outlet in a very rapid manner.

Boss 30, moving within recess 32, guides the regulating member 24 during this oscillating movement. The water exits from the interior of the housing through outlet openings 18, the total area of which (four being shown) is greater than the area of the outlet end of passageway 6.

It has been found that this rapid oscillating movement of regulating member 24, which continuously opens and closes the outlet end of passageway 6, substantially reduces the rate of flow of water through that passageway, thereby permitting the use of relatively large openings having less tendency to clog.

Figure 4:
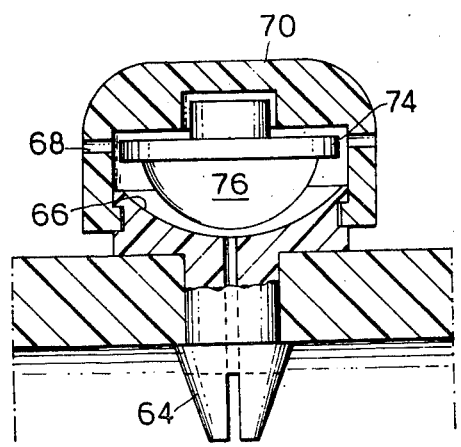
Figure 3:
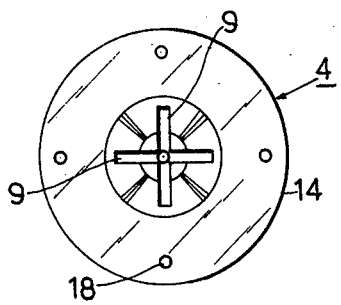

FIG. 4 illustrates a variation in the construction, wherein the outlet end of tube 64 (corresponding to tube 4 in FIGS. 1-3) is formed with a concave configuration 66 and the confronting face of the regulating member 74 is formed with a convex configuration 76. In this case, the radius of the curvature of the convex face 76 of the regulating member is slightly smaller than that of the concave face 66 of the tube outlet end. In addition, the housing outlet openings 68 are formed in the cap 70 rather in the tube outlet end 66. The construction and operation of the device of FIG. 4 are otherwise the same as described with respect to FIGS. 1-3.

IMPROVED VERSION OF THE PRESENT INVENTION

Figure 5:
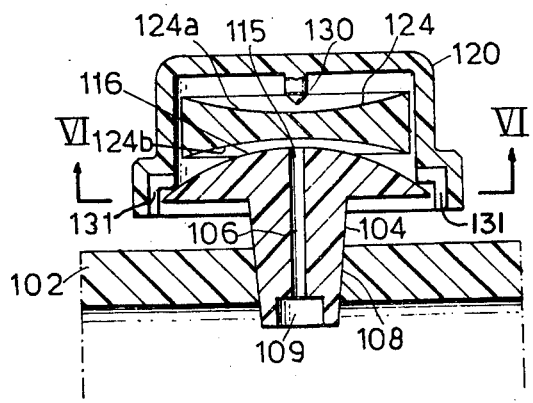
FIGS. 5 and 6 illustrate an improved water trickler nozzle constructed in accordance with the present invention, FIG. 5 being a longitudinal sectional view of the improved nozzle, and FIG. 6 being a transverse sectional view along lines V1 — V1 of FIG. 5.
Figure 6:
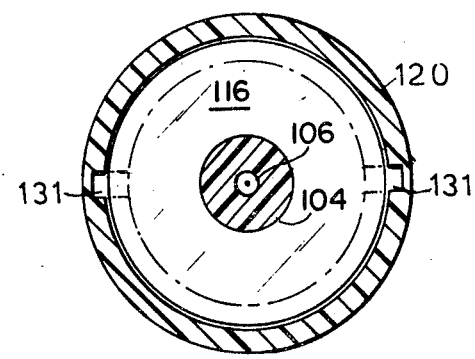

FIGS. 5 and 6 illustrate the improved version of the present invention, also in the form of a water trickler nozzle adapted to be applied as a tap to a plastic water supply pipe, the wall of which is shown at 102. The nozzle includes a conduit member in the form of a tube 104 having a through-going axial bore 106. One end of the tube is tapered, as shown at 108, for friction-fitting same within the pipe wall 102. Bore 106 thus provides an axial passageway for the water received from tube 102. The inlet end of this passageway is enlarged, as shown at 109. The outlet end 115 of passageway 106 passes through an enlarged convex-shaped head 116 formed at the opposite end of tube 104, as in the arrangement of FIG. 1.

A cap 120 is fixed to the periphery of head 116, as by being press-fitted thereon. Cap 120, together with convex head 116 of the tube, constitutes a housing for receiving a disk-shaped regulating member 124 having the same concave surface at opposite sides thereof, as shown as 124a and 124b, respectively. In addition, cap 120 is formed with a central, depending, interior boss 130 of cylindrical shape but pointed at its free end. The open end of cap 120 is press-fitted onto the convex head 116 of tube 104, the cap being formed with a pair of peripheral slots 131 to permit the water to exit from within the cap.

Regulating disc 124 is disposed within the housing defined by cap 120 and head 116 so that when concave surface 124b engages the head to close outlet opening 115, the opposite surface 124a of the disc is spaced from the end of boss 130 depending from cap 120. The radius of curvature of concave surface 124b is larger than that of the convex surface of head 116, as described in FIG. 1, so that when the regulating member 124 closes outlet opening 115, concave face 124b of the regulating disc 124 diverges from the convex face 116 of the tube head in the manner described above to produce the pressure gradient which sets the regulating disc 124 into rapid oscillating movement between convex face 116 and boss 130, thereby rapidly opening and closing the outlet opening 115. The water thus exits from the device, via slots 131, in a slow trickle as described above.

The embodiment of FIGS. 5 and 6 has a number of advantages over the two previously described. One advantage is better performance, since the arrangement including the concave surface 124a on the regulating member 124, limiting against the pointed end of boss 130 of cap 120, provides more freedom of movement for the regulating member during its oscillation. In addition, this arrangement virtually precludes the possibility that the regulating member may become stuck to the cap. Further, the FIGS. 5 and 6 arrangement is simpler to produce and to assemble in mass-production, since the symmetrical configuration of the regulating disc 124 not only enables it to be more simply produced but also to be more simply assembled as it can be merely dropped into place from either side.

Many other variations, modifications and applications of the illustrated embodiment will be apparent.

What is claimed is:

1. A fluid-flow control device comprising a conduit member connectable to a source of pressurized fluid and formed with an axial passageway having an inlet and an outlet, a housing enclosing the passageway outlet and formed with a housing outlet, and a regulating member disposed within the housing in axial alignment with the passageway outlet and freely movable axially of the conduit member and its passageway to open and close its outlet, the face of the conduit member in which the passageway is formed, and the face of the regulating member closing the passageway outlet, being such that when the two faces are in contact to close the passageway outlet, the faces diverge from each other to provide a space between the two which space increases from the passageway outlet, whereby during the flow of fluid through the axial passageway the regulating member is set into rapid oscillating movement axially of the conduit member passageway to rapidly open and close its outlet and thereby to control the flow of fluid therethrough; characterized in that the conduit member face formed with the passageway outlet is of convex configuration, and that both faces of the regulating member are of concave configuration of a slightly larger radius of curvature, the inner surface of the housing including a depending boss adapted to engage the center of the confronting concave face of the regulating member.

2. The device as defined in claim 1, wherein the outlet end of the conduit member is formed with an enlarged head of said convex configuration and is attached along its outer periphery to a cap, said cap and enlarged head defining said housing enclosing the passageway outlet of the conduit member.

3. The device as defined in claim 2, wherein said enlarged head is snap-fitted along its outer periphery to said cap.

4. The device as defined in claim 2, wherein said cap includes at least one slot formed axially along its inner surface to define said housing outlet opening.

5. The device as defined in claim 1, wherein said depending boss is of cylindrical shape and is formed with a pointed free end facing and adapted to engage the respective concave surface of the regulating member.

6. The device as defined in claim 1, wherein said axial passageway formed in said conduit member is of enlarged diameter at the inlet end thereof.

* * * * *